Feb. 4, 1941.　　　M. JAKOSKY　　　2,230,954
CALCULATING APPARATUS
Filed June 17, 1940　　　3 Sheets-Sheet 2

Inventor
Milton Jakosky
By Leech & Radue
Attorneys

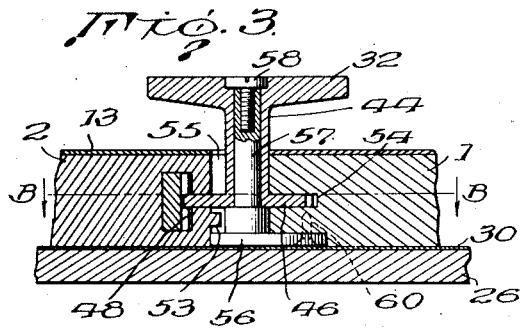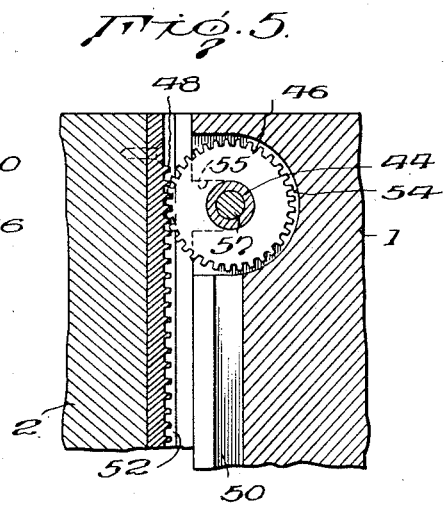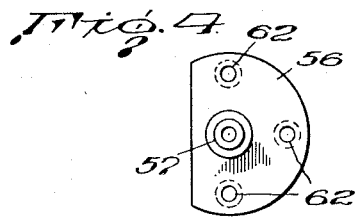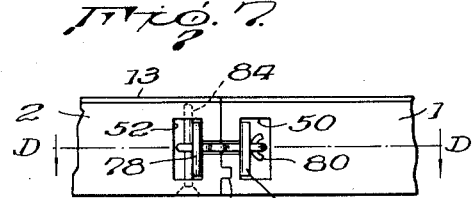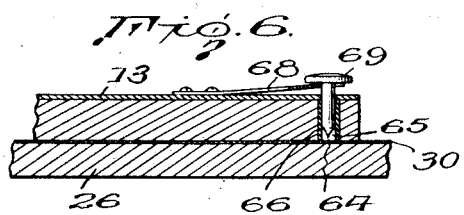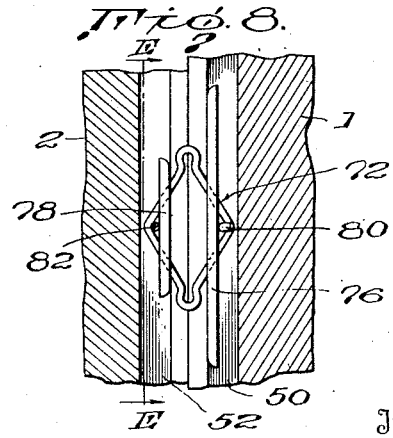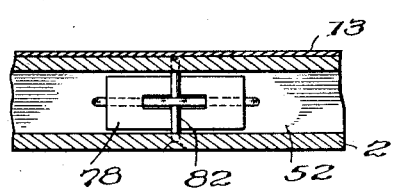

Patented Feb. 4, 1941

2,230,954

UNITED STATES PATENT OFFICE 2,230,954

CALCULATING APPARATUS

Milton Jakosky, Washington, D. C.

Application June 17, 1940, Serial No. 341,041

11 Claims. (Cl. 234—63)

This invention relates to calculating apparatus. More particularly, it is concerned with instrumentalities for obtaining the sum of moments with respect to a selected datum point, either within or without the limits of a loaded structure, and for giving as the ultimate answers the center of gravity of such structure under the particular conditions of loading and the total weight.

The problem to which this invention is specifically addressed is that of distributing the disposable portions of the load in an airplane, or other fluid supported craft, so that it shall have safe flight characteristics.

Other similar problems to which the principles of this invention are applicable are both numerous and obvious.

The flight characteristics of an airplane, particularly its longitudinal stability and controllability are dependent principally upon the fore and aft position of the center of gravity. Since the vertical position of the center of gravity is seldom critical, there is ordinarily no need for taking it into account. However, if the center of gravity is too far forward, the airplane may be too stable, and there may be difficulty in attaining a tail down position for landing. On the other hand, if the center of gravity is too far rearward, the airplane may be longitudinally and directionally unstable and there may be difficulty in attaining a tail high condition essential for takeoff. Consequently, there exist forward and rearward limits for the center of gravity of the airplane, if satisfactory and safe flight characteristics within structural stress limits are to be maintained.

The fore and aft center of gravity of an airplane is, of course, affected by the magnitude and location of the disposable load. In fairly large size aircraft, the disposable load may comprise fuel, oil, crew, baggage, and a number of transverse rows of passenger weights. Also, those aircraft which incorporate in their design a retractible chassis will have their centers of gravity changed by extending or retracting the chassis, if a longitudinal shifting of chassis weight is involved.

In order to load an airplane properly, it is obviously essential that its center of gravity for the particular condition of loading fall within the approved or limiting fore and aft positions. Such a calculation in actual practice involves a determination of the moment of each disposable item, the addition of such moments to the moment of the unloaded plane, and division of the sum of the moments by the total weight.

If the resultant calculation of the center of gravity position is not within the prescribed limits, a new distribution is assumed and the calculation is repeated until a satisfactory position is attained. Thus by trial and error a safe disposition of the load is made. Obviously these calculations are laborious, require appreciable time, and introduce considerable chance of error.

Quite recently, it has been proposed to solve this specific problem by an elaborate compound system of levers which can be loaded to simulate actual conditions. Devices similar to nomographs and slide rules also have been provided for simplifying the required calculations. The first of these proposals entails a very expensive and critical machine for each different model of airplane to be balanced, and the second, while less expensive does not permit juggling of the load items intermediate a complete calculation and leaves considerable room for error in the hands of an unskilled or careless operator. Moreover, none is capable of producing a permanent record of a given loading showing the computation for each item of disposable load.

It is an object of the present invention to provide calculating apparatus for algebraically adding in any order a plurality of products, each of which has a constant multiplier, and indicating the quotient of such summation divided by the sum of the respective multiplicands.

A further object is the provision of simple and practical apparatus employing certain Government certification data commonly used for indicating whether or not an airplane is loaded in accordance with its approved specification.

In the accomplishment of this specific object, a feature of the invention consists in the provision of means for obtaining the center of gravity (longitudinal) of an airplane under particular load conditions and for comparing visually the resultant center of gravity with the prescribed limiting positions for that model airplane.

Another object attained by the invention to be described herein is the provision of reliable instrumentalities for adding algebraically the moments of the different items of disposable load and dividing that summation by the gross weight at any stage of loading to obtain an intermediate or final resultant center of gravity.

It is an additional object to provide a load calculating apparatus for airplanes with means for producing a permanent record of the various load and moment settings.

More specifically, it is intended to provide an apparatus of the character indicated having a plurality of relatively adjustable members or slides in which the slope of each slide edge that is effective has a common base line and is chosen to correspond with the moment arm, with respect to a selected datum point, of its load component. Another related feature of improvement is the combination with such members of a pointer or indicating means cooperating with a calibrated chart in order that the intermediate or final result of the load-balancing calculation will be directly readable on the chart and determined by such intermediate or final position of the pointer.

An auxiliary object resides in the provision of convenient mechanical means for rapidly and accurately setting the scale of each relatively adjustable or movable member.

Another object attained by the present invention is the provision of means for making a permanent record of each item of disposable load as represented by the settings or positions of the respective relatively movable members.

Further novel features of improvement contributing to ease and accuracy in operation and simplifying the construction of apparatus of this nature will be perceived and readily understood from reading the following detailed description of an illustrative embodiment of the invention in connection with the accompanying drawings, in which Fig. 1 is a plan view in perspective of the complete apparatus;

Fig. 3 is an enlarged vertical section of a slide member actuating means, taken on line A—A of Fig. 1;

Fig. 4 is a plan view of a part of the slide member actuating means;

Fig. 5 represents an enlarged horizontal section taken on the line B—B of Fig. 3 to show the slide member actuating means;

Fig. 6 is an enlarged vertical section of a recording device, taken on line C—C of Fig. 1.

Fig. 7 is an enlarged end view of an adjacent pair of slide members and the means for holding them together;

Fig. 8 is a horizontal section taken on line D—D of Fig. 7; and

Fig. 9 is a vertical section along the line E—E of Fig. 8.

Figure 1:
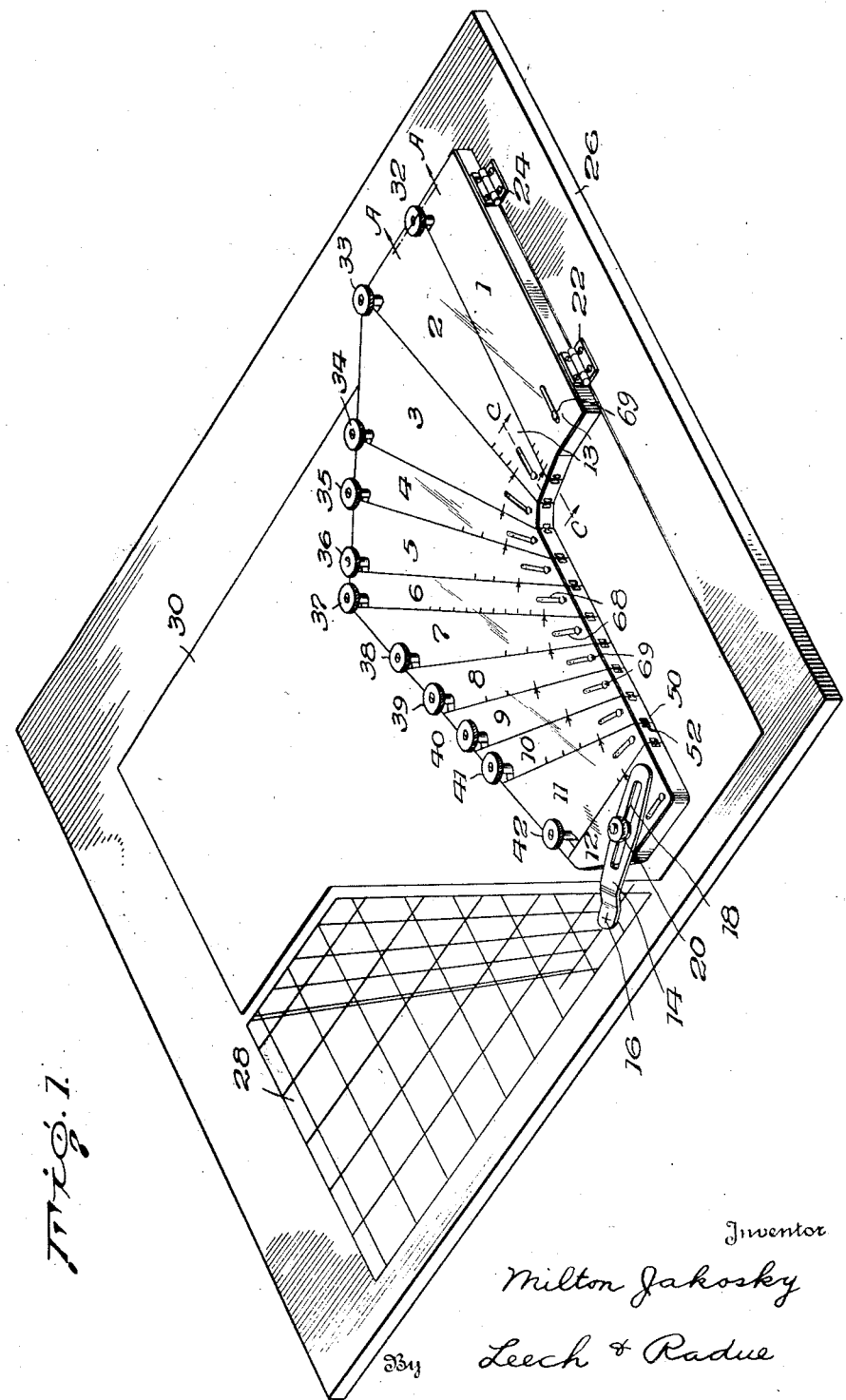
Figure 2:
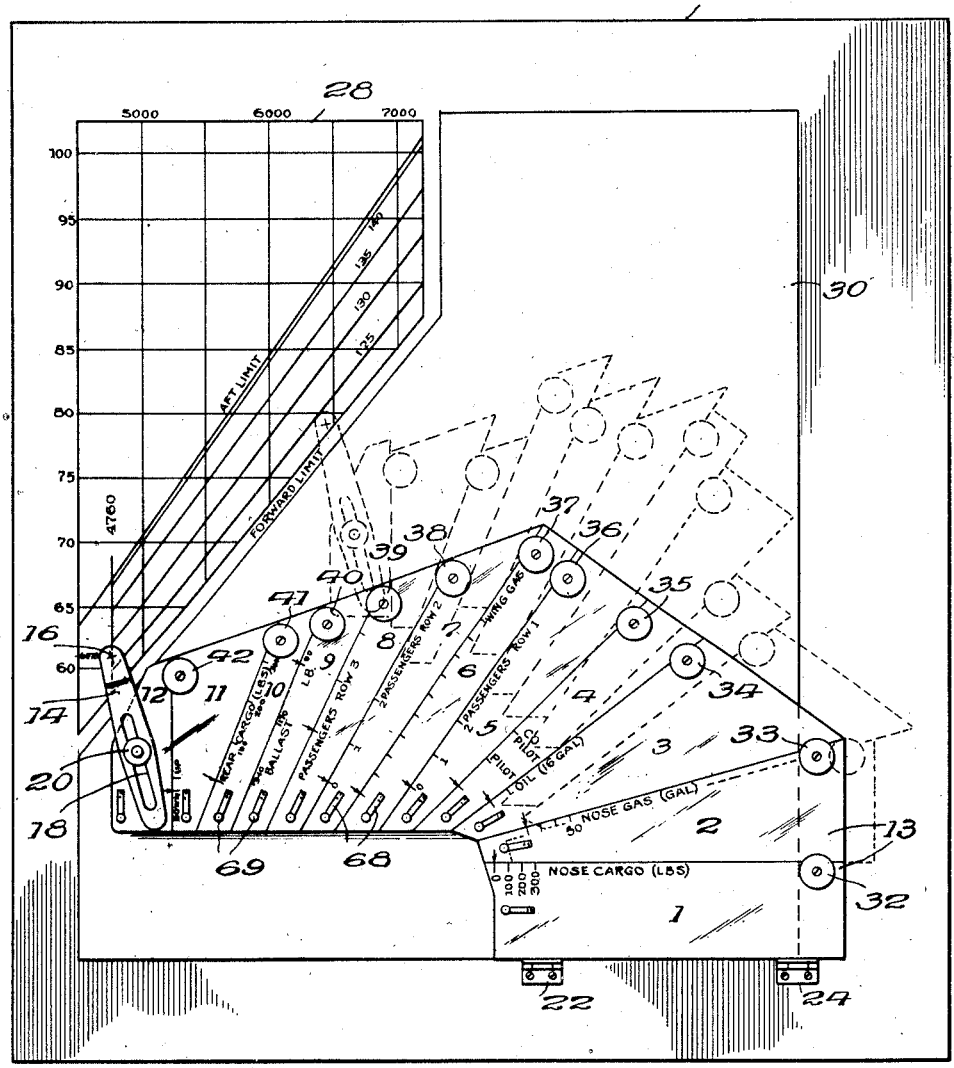
Fig. 2 is a diagrammatic plan view of the apparatus of Fig. 1, and showing a typical calculation in dotted lines.

As seen in Figs. 1 and 2, the apparatus comprises a series of horizontal slide members arranged in fan shape for relative linear movement in the same general plane. Slide member 1 which is fixed and horizontal is graduated in terms of nose cargo. Inclined slide member 2 and 3 are graduated and sloped to give the moment as well as weight of the nose gas and oil loads respectively. Inclined slide member 4 accomplishes the same for the pilot and copilot. An additional slide member 5 performs the same function for the first row of passengers. Slide member 6 similarly provides for wing gas; and rows 2 and 3 of passengers are provided for by slide members 7 and 8, respectively. A further slide member 9 is graduated and sloped to subtract the moment and weight effect of discharged ballast. In a like manner the added moment and weight effect of rear cargo is taken care of by slide member 10. Vertical slide member 11 provides means for mechanically determining the difference in moment produced by longitudinal weight displacement in retracting or extending the chassis. Cooperating with the landing gear scale of slide member 11 is a vertical slide 12 having a Celluloid covering 13 on its top or scale side. All of the other members or slides are covered in an identical fashion and thus permit the graduations to be made on the Celluloid or similar material. A transparent pointer 14 is carried by the endmost slide member 12.

The preferred thickness for the various slide members is approximately three-eighths of an inch and they may be formed from a suitable plastic, e. g., Bakelite, or from Duralumin or the like. Likewise, the pointer 14 may be formed from a transparent plastic having intersecting centering lines 16 or a similar device at its outward end for purposes to be described.

Adjustment of the pointer 14 is provided for by a longitudinal slot 18 extending outwardly from adjacent its inner end and a clamping thumb screw 20 which passes through said slot 18 and is threaded vertically into the end slide member 12.

A spaced pair of hinges 22 and 24 secure the outer edge of member 1 to a generally rectangular panel board 26 of seasoned wood or other suitable material.

A chart 28, corresponding to a portion of the Government certification data for the particular model airplane and defining as a quadrilateral the fore and aft limits of center of gravity and the range of disposable weight or load, is secured to the panel board 26 in operative relation to the pointer or indicating means 14, as shown in Figs. 1 and 2.

The hinge connections 22 and 24 permit raising as a body of the various interlocked slide members and the attached pointer 14 for the insertion of a suitable record card or sheet 30 in a predetermined position such that the range of movement of each slide member from zero position will be confined to said record card and so that a trace of the set of calculations can quickly and easily be made by running a pencil along the ends of said members after all have been adjusted for the given load conditions.

While in its simplest form the present apparatus needs only to include a series of interrelated, relatively movable slide members, it is highly desirable that means be provided for quickly and accurately setting each slide to its required position. For accomplishing the required slide setting, a hand knob 32 is disposed between slide members 1 and 2 adjacent their outer ends. Similar knobs 33 and 34 are likewise positioned between the adjacent edges of slide members 2 and 3, and 3 and 4 respectively.

In a similar manner, knobs 35 and 36 are positioned between slide members 4 and 5 and slide members 5 and 6. With this particular embodiment and application of the present invention, knobs 37, 38, 39, 40, 41 and 42 are provided in the required positions between slide members 6 and 7, 7 and 8, 8 and 9, 9 and 10, 10 and 11, and 11 and 12, respectively.

Since all of these knobs and their relation to adjacent slide members are the same, it will be sufficient to describe in detail knob 32 which is positioned between members 1 and 2. Referring to Fig. 3, attention is called to the hollow shaft 44 which extends below the knob proper and terminates in a horizontal pinion gear 46 which may be integral therewith. Ordinarily, these knob parts will be formed of a suitable metal.

The knob 32 and its gear 46 are supported by the slide 1 so as to engage a rack section 48 which is fixed to slide 2. The rack 48 in each instance will be of such a length and so positioned as to accommodate the required relative movement of this particular pair of slides.

An opposed pair of horizontal T-grooves 50 and 52 are formed in the edges of members 1 and 2, respectively, to provide an H-shaped housing for the gear 46 and rack 48. On their meeting faces the members 1 and 2 may also be provided with a tongue and groove pair 53 for maintaining vertical alignment. In addition, a horizontal recess 54 of semicircular shape extends from the groove or slot 50 to accommodate the gear 46 in member 1. There is also a vertical slot 55 extending downwardly from the upper side of member 1 to permit lateral insertion of the hollow shaft 44 of knob 32. A cover plate 56 is countersunk below the lower face of member 1 and has an upwardly projecting stud portion 57 fitting closely in shaft 44 and retained by a stud screw 58 which is inserted through the upper end of knob 32, as shown, and has threaded engagement with said stud portion 57. A plurality of fastening screws 60, 60 extend upwardly through apertures 62, 62 in plate 56 and securely engage the slide member 1.

In Fig. 6, there is illustrated a single recording perforator 64, one of which is positioned close to the inner end of each slide member. Each perforator 64 is pointed at its lower end and arranged to slide vertically in a bore 65, having a guiding sleeve 66, through its slide member. To hold said pointed perforator 64 in a retracted position, a thin spring strip 68 loosely engages its upper end beneath a finger knob 69, in the manner shown, and has its opposite end secured to the slide member by means such as screws or the like.

Reference is now made to Figs. 7, 8 and 9 which illustrate one of a plurality of means 72 which are provided for holding adjacent slide members, for example 1 and 2, in interlocked sliding engagement. The holding means 72 comprises a small horizontally disposed diamond-shaped spring which spans the opposed T-grooves 50 and 52 and is extended on its opposite lateral sides through a pair of longitudinally slotted bearing plates 76 and 78 which are held against the proximate vertical sides of the grooves 50 and 52 by a locking pin 80 and a locking and anchoring pin 82 respectively. It is preferable that the sliding bearing plate 76 be somewhat longer than the stationary plate 78; see Fig. 8. The locking pin or machine screw 82 is anchored in the slide member 2 by its cooperation with an upwardly extending bore 84 thereof. One or more of the holding means 72 may be used between each pair of slide members to draw them together, and anchored to the slide member of the pair which moves relatively of the other in setting.

It is believed that the operation of the apparatus which has been set forth in detail above can be most readily understood by a consideration of its application to a specific problem in load balancing as exemplified by the dotted line positions of the slide members and pointer shown in Fig. 2.

On the chart 28, the ordinate distances represent moments (inch-pounds) or moments abbreviated to index numbers. The horizontal or abscissae distances are measures of weight (pounds). Therefore, the ratio of moment (M) to weight (W) determines the lever arm (R) for a particular condition of moment and weight. If from this particular condition the weight and moment factors are increased or decreased in such a manner as to maintain a constant $$\frac{M}{W}$$

ratio, the locus will be a straight line.

Accordingly, the upper linear limit of the quadrilateral diagram of chart 28 defines the "aft limit" to which the center of gravity, c. g., of the airplane can be shifted longitudinally without exceeding the approved fore and aft center of gravity limits of the airplane, and the lower linear limit, the "forward limit" for such displacement as the airplane is loaded.

The empty weight will establish the extreme left position of the certification diagram with respect to the axes of chart 28; and the opposite or extreme right boundary of the diagram is determined by the permissible gross weight of the loaded airplane, that is, the empty weight added to the disposable load weight.

The possibility of confusion in making the required settings is reduced if a datum plane is selected which will result in all moments being of the same sign, that is, each item of weight will tend to produce rotation in the same direction with respect to that datum. Accordingly, the datum hereinafter employed is that passing through the centroid of nose cargo of the craft.

Obviously, appropriate rearrangement of the relative angular slopes of the slide members and a corresponding relocation of the datum will permit the calculator of the present invention to be used in other quadrants and in a range of several quadrants, as exigencies of the problem may entail. Any desired change in the number of variables dealt with in the calculation can likewise be made.

Referring now to Fig. 2, the centering lines 16 of the adjustable pointer 14 will be set initially on the left of chart 28 in a position corresponding to the weight empty and c. g. of the airplane before addition of the disposable items of load, and the slide members will be concurrently zeroed to the pattern of the full line showing. While it has been stated previously that the settings for the calculation may be made in any order, they will now be described in their position sequence.

The "nose cargo" is at the selected datum, and, therefore, the movement of the index arrow on slide member 2 relative to that scale of fixed member 1 will be horizontal—to add weight, as indicated by pointer 14, without increasing the total moment. In the dotted line position the setting is for 200 lbs.

As slide member 3 is moved relative to member 2 to a position representing the addition of 50 gal. of "nose gas," all of the interlocked slide members to the left thereof will move in a manner which will add moment as well as weight to the intermediate position of pointer 14. Attention is called in particular to the fact that the slope of the inclined, linear path of the pointer 14 during this setting is that determined by the measured lever arm of the "nose gas" load. In other words, increase in moment has a linear variation with increase in weight. That is, of course, true of each of the inclined slide members remaining to be described.

The effect of "oil" load is introduced into the calculation by means of the inclined scale on slide member 3 upon which is set to 16 gal. the index arrow carried by slide member 4.

So, the "pilot—co-pilot" scale on the upper edge of slide member 4, by means of which the index arrow of slide member 5 is set to correspond with the particular condition of that load item, both pilots being in place.

Each passenger row has its own particular moment arm, and the balancing with respect to "passengers row 1" is obtained by a suitably graduated scale on slide member 5 cooperating with an index arrow on slide member 6. As shown, there is one passenger in "row 1."

In this particular instance, the moment arm for "wing gas" is the same as for "passengers row 1." Accordingly, the "wing gas" scale of slide member 6 is made parallel with "passengers row 1" scale of slide member 5, and the former cooperates with an index arrow carried by slide member 7 to register 100 gal.

The upper edge of slide member 7 is marked with a "passengers row 2" scale, with respect to which an index arrow on slide member 8 is appropriately moved for a load condition of one passenger.

For "passengers row 3," there is a scale on the upper edge of slide member 8 cooperating with an index arrow on slide member 9, and the setting here is also for one passenger.

Ordinarily, the removable "ballast" will be reduced or completely discharged as sufficient disposable load is taken on, and that condition is met by the reverse or inward movement of the index arrow on slide member 10 with respect to the "ballast" scale on slide member 9, as the former is set to its dotted line position. The pointer 14, will, therefore, be moved backward appropriately to subtract 170 lbs. of ballast weight and its moment from the mechanical calculation. The empty weight of the airplane in the present case included 340 lbs. of ballast.

Slide member 10 has on its inclined upper edge a scale graduated in terms of "rear cargo" and the index arrow on slide member 11 for that scale is set to a load of 100 lbs.

In this particular airplane operation of the main landing gear is accompanied by a longitudinal shifting of its centroid or variation of its lever arm. By means of an "up" and "down" vertical scale on slide member 11 cooperating with an index arrow on pointer slide member 12, the variation in moment without addition of weight can be properly included in the balancing calculation. Since the centroid of the chassis is moved away from the datum in the "up" position, this will be another addition in moment, as shown dotted.

Through algebraic addition of moment items and addition of weight or moment alone, the calculation has been taken through the required steps to produce a final (and dotted) pointer 14 position which falls within the safe limits defined by the quadrilateral diagram of chart 28. With the suitable intermediate c. g. position lines which are provided within that diagram, the resultant c. g. position as well as the gross weight are readable directly.

If desired, a permanent record or load manifest can now be made by perforating the record card or sheet 30 by means of the recording means or perforators 64 with which each slide member is provided adjacent its inner end to show final relative positions, it being noted that the hinged member 1 which is fixed as regards relative movement in the plane of the card 30 also carries a perforator 64 in order that an orienting point can be produced on said record card. A pencil trace may also be made along the ends of slides by way of a further or alternative record of the balancing calculation.

By way of summary, it is observed that the slope of each slide member scale represents a definite moment arm or constant multiplier, and that each scale represents a variable load in pounds (multiplicand), although in some instances the graduation is, for convenience, in terms of volumetric or other load units.

The mathematical capacity of the apparatus of this invention may be represented by the following expression which will be subsequently defined:

$$Q = \frac{\Sigma(\pm F_1 L_1 \pm F_2 L_2 \pm F_3 L_3 \pm \ldots \pm F_n L_n \pm V)}{\Sigma(\pm F_1 \pm F_2 \pm F_3 \pm \ldots \pm F_n \pm H)}$$

Q represents the quotient of the indicated division of numerator by denominator.

F in each instance is a variable having any value from zero (0) to the physical limits of a particular apparatus. The variation is not necessarily a linear one since the scale graduations can be made correspondingly non-uniform.

L is representative of a single constant factor or multiplier and determines the slope of one scale edge of a particular slide member.

V stands for the magnitude in a vertical axis direction of any FL product which is to be added or subtracted initially or finally to the other part of the numerator in the above equation.

H similarly represents an F magnitude in a horizontal axis direction to be added or subtracted initially or finally to the other part of the denominator in the above equation.

V and H can be zero or any real value, subject only to the physical limits of the apparatus.

As used in the specification and claims, "slide", "member", and slide member" refer to the same elements which have been illustrated specifically; and these as well as all other terms which have been used are to be taken in their illustrative rather than limiting sense.

It is contemplated that the sets of slide members comprising the kinetic parts of the calculating apparatus will be supplied separately as articles of manufacture, and for that reason certain of the appended claims have been drawn to such a sub-combination.

Having thus described the invention, what is claimed as new and desired to be secured by Letters Patent is:

1. In a calculating apparatus of the character described, a plurality of adjacent, interlocked members constructed and arranged to slide linearly relative to each other in the same general plane, the member at one end being adapted to be fixed in position during a calculating operation, and the member at the other end having indicating means movable therewith for cooperation with a chart, and each member having at least one edge sloped with respect to a common base line according to the relative value of a fixed multiplier, and the said edges of the members being variously sloped, whereby at each member setting the indicating means will be given a movement having the direction of the slope of the member edge immediately adjacent the member being set and with respect to which it is relatively moved in making that setting, and a magnitude representing a given and variable multiplicand.

2. In a calculating apparatus of the character described, a plurality of adjacent, interlocked members constructed and arranged to be moved linearly relative to each other in the same general plane, the member at one end being adapted to be anchored in position; a pointer movable with the member at the other end, and each member having at least one edge sloped with respect to a common base line to correspond to a fixed multiplier, and the said edges of the members being variously sloped, whereby the pointer at the time of each member setting will be given a movement having the direction of the slope of the member edge immediately adjacent that member, and with respect to which it is relatively moved in making that setting, and the movement of the pointer having a magnitude representing a given multiplicand; and perforating means on each member for recording its relative position.

3. In a calculating apparatus of the character described, a plurality of adjacent, interlocked members provided with cooperating scale and index means on their adjacent edges and constructed and arranged to slide relative to each other in a single plane, the member at one end being adapted to be anchored in position; an adjustable pointer carried by the member at the other end, and each member having at least one edge sloped with respect to a common base line to correspond to a fixed factor, and the said edges of the members being variously sloped, whereby at each member setting the pointer will be given a movement having the direction of the slope of the member edge immediately adjacent the member which is being set, and with respect to which it is moved in setting, and a magnitude representing a given multiplicand; and means for setting said members.

4. In a calculating apparatus of the character described, a plurality of adjacent members constructed and arranged to be moved relative to each other, the member at one end being adapted to be anchored in position; a pointer carried by the member at the other end, and each member having at least one edge sloped with respect to a common base line to correspond to a fixed multiplier, and the said edges of the members being variously sloped, whereby at each member setting the pointer will be given a movement having the direction of the slope of the member edge immediately adjacent the member which is being set, and with respect to which it is moved in setting, and a magnitude representing a given multiplicand; means for setting said members; and resilient means for drawing said members together in a common plane, the setting means and holding means being adapted to cause the pointer-carrying member and all members between it and the edges of relative movement to move together.

5. Calculating apparatus for algebraically adding in any order a plurality of products, each of which has a constant multiplier, and indicating the quotient of such summation divided by the sum of the respective multiplicands comprising, in combination, an interlocked series of relatively movable co-planar members including a fixable member at one end of the series; a pointer secured to the member positioned at the other end of the series, each of the intermediate members having opposite edges sloped with respect to a common base line and matching with the meeting edges of the adjacent members, and each of the end members having its inner edge sloped in a similar manner with respect to the common base line, and matching the meeting edge of the adjacent intermediate member, and the said edges of the members being variously sloped whereby setting of any movable member will impart to the pointer a resultant movement which has as its components the horizontal and vertical movement corresponding to the slope of the member edge guiding that setting and the magnitude of movement along that member; means for moving the members relative to each other; and individual means associated with each member for recording the relative positions of the various members.

6. Calculating apparatus for algebraically adding in any order a plurality of products, each of which has a constant multiplier, and indicating the quotient of such summation divided by the sum of the respective multiplicands comprising, in combination, an interlocked series of relatively movable members with cooperating scale graduations and indexes and including a fixed member at one end of the series; a pointer secured to the member positioned at the other end of the series, each of the intermediate members having opposite edges sloped with respect to a common base line and matching with the meeting edges of the adjacent members, and each of the end members having its inner edge sloped in a similar manner with respect to the common base line, and matching the meeting edge of the adjacent intermediate member, and the said edges of the members being variously sloped whereby setting of any movable member will impart to the pointer a resultant movement which has as its components the horizontal and vertical movement corresponding to the slope of the member edge directing that setting and the magnitude of movement along that member; and a chart diagrammed according to preselected limits arranged for cooperation with said pointer in its range of movement, whereby the position at any time of the pointer, with respect to said chart, will determine conformity to said limits.

7. Calculating apparatus for algebraically adding in any order a plurality of products, each of which has a constant multiplier, and indicating the quotient of such summation divided by the sum of the respective multiplicands comprising, in combination, an interlocked series of relatively movable members including a fixed member at one end of the series; a pointer adjustably secured to the member positioned at the other end of the series, each of the intermediate members having opposite edges sloped with respect to a common base line and matching with the meeting edge of the adjacent member; and each of the end members having its inner edge sloped in a similar predetermined manner with respect to the common base line, and matching the meeting edge of the adjacent intermediate member, and the said edges of the members being variously sloped whereby setting of any movable member will impart to the pointer a resultant movement which has as its components the horizontal and vertical movement corresponding to the slope of the member edge guiding that setting and the magnitude of movement along that member; a diagrammed chart arranged beneath the pointer and marked with certain limits; and means on each member for recording the relative positions of the members at the completion of the calculation.

8. In a calculating apparatus for balancing the load of an airplane or the like comprising, in combination, an interlocked series of members relatively movable with respect to each other in which the member at one end of the series is adapted to be fixed, and the member at the other end of said series being provided with indicating means for cooperation with a chart, and each of the intermediate members of the series having predetermined slopes on its opposite edges which coincide with those of the adjacent edges respectively of the other members, the slope of each such edge being referred to a common base line and corresponding to the moment arm of an item of disposable load, and the members having cooperating scale graduations and index means for facilitating the respective settings.

9. In a calculating apparatus for balancing the load of an airplane or the like comprising, in combination, a coplanar, fan-shaped series of interrelated members relatively slidable with respect to each other in which the member at one end of the series is adapted to be fixed, and indicating means movable with the member at the other end of said series and arranged for cooperation with a chart or the like, each of the intermediate members of the series having predetermined slopes on its opposite edges which coincide with those of the adjacent edges respectively of the other members, the slope of each such edge corresponding to the moment arm of an item of disposable load, and the members having cooperating scale graduations and index means for facilitating the respective settings, said scale graduations being representative of load in units of weight, whereby the position of the indicating means will serve to indicate the displacement of the center of gravity of the airplane or the like as disposable load is added or subtracted.

10. In a calculating apparatus for balancing the load of an airplane or the like comprising, in combination, a coplanar series of interlocked members relatively movable with respect to each other and in which the member at one end of the series is fixed; a pointer carried by the member at the other end of said series, each of the intermediate members of the series having predetermined slopes on its opposite edges which coincide with those of the adjacent edges respectively of the adjacent members, the slope of each such edge being referred to a common base line and corresponding to the moment arm of an item of disposable load, and the members having cooperating scale graduations and index means for facilitating the respective settings, said scale graduations being representative of load in units of weight; a chart cooperatively disposed with respect to the pointer and indicating prescribed limits for disposable load and longitudinal displacement of the center of gravity of the airplane or the like; and means on each member for recording the final relative position of each member.

11. In a calculating apparatus of the character described, a panel board; a plurality of adjacent members constructed and arranged to be moved relative to each other in a plane parallel to that of the board, the member at one end being hingedly connected adjacent its outer edge to the panel board; a pointer carried by the member at the other end, and each member having at least one edge sloped with respect to a common base line to correspond to a fixed multiplier, and the said edges of the member being variously sloped, whereby at each member setting, the pointer will be given a movement having the direction of the slope of the member edge immediately adjacent the member which is being set, and with respect to which it is moved in setting, and a magnitude representing a given multiplicand; means for setting said members; resilient means for drawing said members together in a common plane, the setting means and holding means being adapted to cause the pointer-carrying member and all members between it and the edges of relative movement to move together; a chart arranged beneath the path of the pointer; and means on each member for recording the relative positions of the members at the completion of the calculation.

MILTON JAKOSKY.